Oct. 9, 1928.

J. M. NORTH

VALVE GRINDER

Filed April 7, 1926      2 Sheets-Sheet 1

1,687,382

J. M. North  INVENTOR
BY Victor J. Evans
ATTORNEY

WITNESS:

Oct. 9, 1928.
J. M. NORTH
1,687,382
VALVE GRINDER
Filed April 7, 1926      2 Sheets-Sheet 2
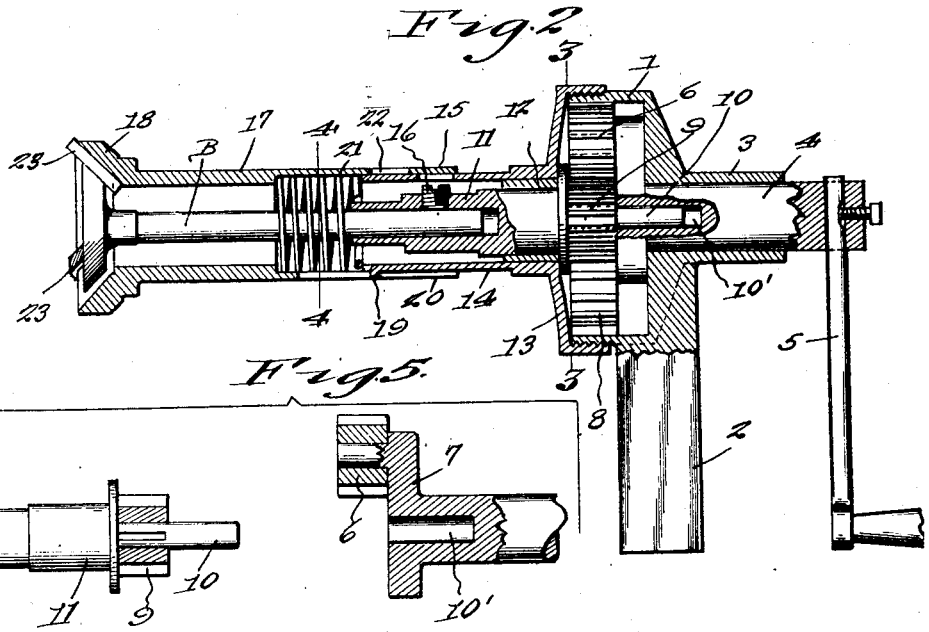
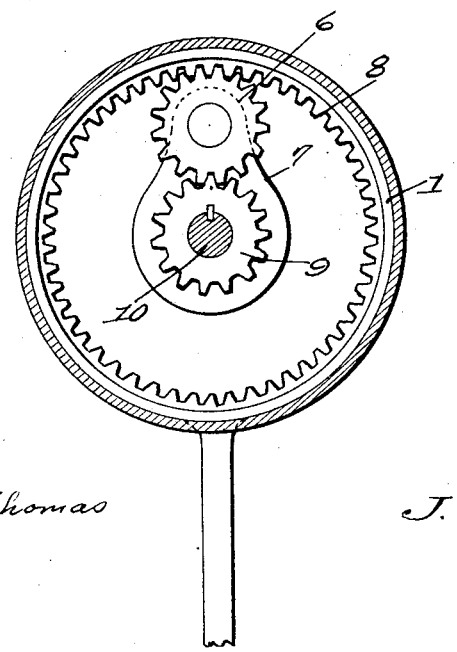
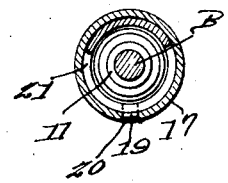
J. M. North INVENTOR Patented Oct. 9, 1928.

1,687,382

UNITED STATES PATENT OFFICE.

JOSEPH M. NORTH, OF ARNOLD, KANSAS.

VALVE GRINDER.

Application filed April 7, 1926. Serial No. 100,429.

This invention relates to a valve grinding device, the general object of the invention being to provide a device whereby valves of internal combustion motors and the like can be easily and quickly refaced and reground.

This invention also consists in certain other features of construction and in the combination and arrangement of the several parts, to be hereinafter fully described, illustrated in the accompanying drawings and specifically pointed out in the appended claims.

In describing my invention in detail, reference will be had to the accompanying drawings wherein like characters denote like or corresponding parts throughout the several views, and in which:—

Figure 2 is a sectional view through the device.

Figure 3 is a section on line 3—3 of Figure 2.

Figure 4 is a section on line 4—4 of Figure 2.

Figure 5 is a sectional detail view through a portion of the crank and its gear and the chuck.

Figure 1:
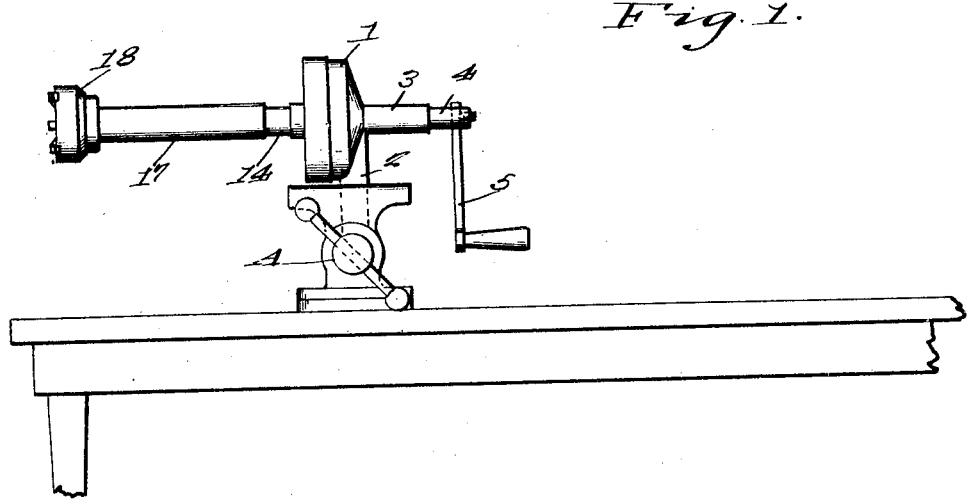
Figure 1 is a view showing how the device can be held in operative position by a clamp on a table or bench.

In these drawings, 1 indicates a casing which is provided with a depending shank 2 which forms a handle or which can be clamped between the jaws of a clamp, such as shown at A in Figure 1, to support the casing on a bench or table. The casing is formed with a bearing 3 for the crank shaft 4 which has a handle 5 attached to one end thereof. A pinion 6 is carried by an arm 7 of the crank shaft and this pinion engages a ring gear 8 attached to the inner wall of the casing. The pinion also engages a pinion 9 keyed to a shaft 10 which is formed with the chuck 11, said chuck being journaled in a bearing 12 formed by a reduced part of the cap 13 which is threaded to the casing. The reduced part is provided with an extension 14 which surrounds the chuck and has a hole 15 therein for providing access to a set screw 16 carried by the chuck for clamping the stem of a valve such as B therein or the shank of a valve grinding tool, such as C (Figure 7) therein. The shaft 10 fits in a socket 10′ formed in the crank shaft 4 so that the chuck is provided with two bearings.

A refacing tool, composed of a sleeve 17 and a head 18 having a flaring opening therein, may be placed over the extension 14 and said sleeve has sliding movement on the extension but is held against rotary movement through means of a projection 19 on the extension engaging a slot 20 in the sleeve. A spring 21 is arranged in the sleeve and bears against a shoulder therein and against the outer end of the extension 14 and tends to force the sleeve outwardly. The sleeve also has a hole 22 therein which, when the sleeve is pushed inwardly, will register with the hole 15 so that a screw driver or the like can be placed in engagement with the set screw 16 to adjust the same. The head 18 carries the cutters 23 for refacing a valve such as B.

From the foregoing. it will be seen that when a valve is to be refaced, the device is placed in a clamp, such as shown in Figure 1, and the sleeve 17 placed on the extension 14. The valve is then pushed through the sleeve with its stem engaging the chuck, the sleeve being forced inwardly until the hole 22 registers with the hole 15 so that the screw 16 can be tightened on the valve stem by a screwdriver or the like. The stem must be so adjusted in the chuck that the spring will hold the cutters with sufficient pressure against the valve face as to insure a good cutting action when the chuck is turned. The handle 5 is then turned, the motion of which will be communicated to the chuck through the gears shown, so that the valve B will be turned and thus the cutters 23 will reface the valve 3. If the pressure of the spring is not great enough, further pressure can be placed on the parts by the hand of the operator.

Figure 7:
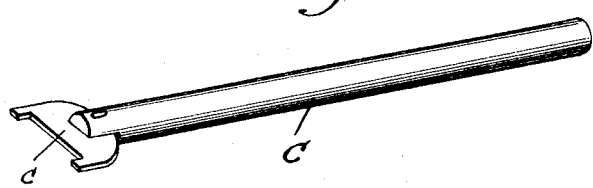
Figure 7 is a view of the device for regrinding a valve.
Figure 6:
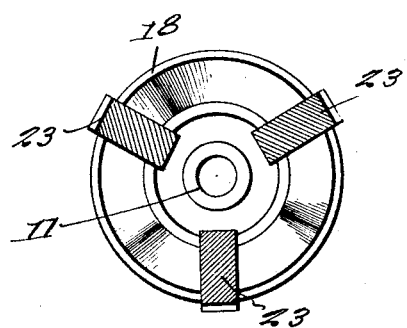
Figure 6 is an end view of the sleeve and its refacing head.

When a valve is to be reground, the sleeve 17 is removed and the stem of a tool, such as shown at C in Figure 7, is inserted in the chuck 11 and the head c of the tool placed in engagement with the valve head. Then the chuck is moved back and forth by the handle 5 to rock the valve in its seat or this rocking can be done by means of the shank 2.

It will thus be seen that valves of internal combustion motors and the like can be quickly and easily refaced and reground. If desired, the chuck can be made adjustable so that it can be used with different sizes of valves.

It is thought from the foregoing description that the advantages and novel features of my invention will be readily apparent.

I desire it to be understood that I may make changes in the construction and in the combination and arrangement of the several parts, provided that such changes fall within the scope of the appended claims.

What I claim is:—

1. In a device of the character described, a casing, a cap threaded on one end of the casing and including a tubular extension projecting centrally therefrom, a shaft journaled in the other end of the casing and having a longitudinal bore, a crank arm on said shaft, a pinion carried by said arm, a ring gear arranged within the casing and meshing with said pinion, a chuck journaled in said tubular extension and including a shaft journaled in said bore of the aforementioned shaft, a pinion carried by the chuck and meshing with the first mentioned pinion, a sleeve mounted on said extension, and cutters carried by said sleeve.

2. In a device of the character described, a casing, a cap threaded on one end of the casing and including a tubular extension projecting centrally therefrom, a shaft journaled in the other end of the casing and having a longitudinal bore, a crank arm on said shaft, a pinion carried by said arm, a ring gear arranged within the casing and meshing with said pinion, a chuck journaled in said extension and including a shaft journaled in the bore of the aforementioned shaft, a pinion carried by the chuck and meshing with the first mentioned pinion, a sleeve slidably mounted on said extension and having a longitudinal slot, a projection formed on said extension and arranged in the slot to prevent rotation of the sleeve, said sleeve and extension having openings adapted to be arranged in registration upon movement of the sleeve in one direction, an internal shoulder formed on the sleeve, a coil spring interposed between the shoulder and said extension for holding the sleeve extended, and cutters carried by said sleeve.

In testimony whereof I affix my signature.

JOSEPH M. NORTH.